United States Patent
Kamezawa et al.

(10) Patent No.: US 9,507,724 B2
(45) Date of Patent: Nov. 29, 2016

(54) MEMORY ACCESS PROCESSING METHOD AND INFORMATION PROCESSING DEVICE

(71) Applicant: FUJITSU LIMITED, Kawasaki-shi, Kanagawa (JP)

(72) Inventors: Hiroyuki Kamezawa, Numazu (JP); Yasuo Ueda, Numazu (JP); Tsutomu Itoh, Numazu (JP); Hideo Shitaya, Tagata (JP); Yasunori Goto, Numazu (JP); Miyako Uchida, Shizuoka (JP); Ken Ichikawa, Kawasaki (JP); Hidetoshi Seto, Sunto (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/816,901

(22) Filed: Aug. 3, 2015

(65) Prior Publication Data
US 2016/0062902 A1    Mar. 3, 2016

(30) Foreign Application Priority Data
Aug. 28, 2014    (JP) .................. 2014-173578

(51) Int. Cl.
*G06F 12/00* (2006.01)
*G06F 12/08* (2016.01)
*G06F 12/10* (2016.01)

(52) U.S. Cl.
CPC ....... *G06F 12/0891* (2013.01); *G06F 12/0893* (2013.01); *G06F 12/109* (2013.01); *G06F 2212/604* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 6,622,231 B2* | 9/2003 | Kaufman | G06F 12/10 711/154 |
| 2001/0047457 A1* | 11/2001 | Kaufman | G06F 12/10 711/141 |
| 2008/0301398 A1* | 12/2008 | Falik | G06F 12/1009 711/206 |
| 2015/0220447 A1* | 8/2015 | Okamoto | G06F 12/023 711/130 |

FOREIGN PATENT DOCUMENTS

| | | |
|---|---|---|
| EP | 0 262 301 | 4/1988 |
| JP | 63-25747 | 2/1988 |
| JP | 10-003423 | 1/1998 |

* cited by examiner

*Primary Examiner* — Brian Peugh
(74) *Attorney, Agent, or Firm* — Staas & Halsey LLP

(57) ABSTRACT

A memory access processing method includes storing, in a cache memory, a plurality of pages stored in a main memory; storing the plurality of pages in a buffer memory, each of the plurality of pages being associated with an identifier indicating whether the each of the plurality of pages being a zero page to be zero-cleared; allocating a page to be set to a zero page, when a page fault occurs during execution of an access to the cache memory and execution of a process is stopped; updating an identifier corresponding to the allocated page to an identifier indicating the allocated page being the zero page; resuming the execution of the process; controlling an access to the cache memory, based on the identifier for each of the plurality of pages; and executing initialization of a page corresponding to the allocated page and is included in the main memory.

12 Claims, 12 Drawing Sheets

MEMORY ACCESS PROCESSING METHOD AND INFORMATION PROCESSING DEVICE

CROSS-REFERENCE TO RELATED APPLICATION

This application is based upon and claims the benefit of priority of the prior Japanese Patent Application No. 2014-173578, filed on Aug. 28, 2014, the entire contents of which are incorporated herein by reference.

FIELD

The embodiments discussed herein are related to a memory access processing method and an information processing device.

BACKGROUND

In a case of providing a page of a main memory to a process, an operating system (OS) provides the page after zero-clearing the page. Here, the page is a management unit of the main memory. For each page, reading from the main memory to a cache memory is performed. A main purpose of the zero-clearing is to destroy a content of the main memory. By providing the page while destroying the content of the main memory, the OS avoids that information of a previous user is leaked to a subsequent user.

The zero-clearing is processing useful for the security of a system. However, the zero-clearing is processing that consumes a lot of central processing unit (CPU) time. In some cases, the CPU time accounts for 20% of the execution time of an application. Therefore, in a program that requests high-speed performance, it becomes important to reduce time taken for the zero-clearing.

As methods of the related art for zero-clearing, there are two methods. FIG. 11A is a diagram for explaining a first method for the zero-clearing. FIG. 11B is a diagram for explaining a second method for the zero-clearing.

As illustrated in FIG. 11A, in the first method, if a process uses a page for the first time and a page fault occurs (1), a memory handler of the OS allocates a page (2) and zero-clears the page (3). In addition, the OS restores processing of the process (4).

As illustrated in FIG. 11B, in the second method, the OS preliminarily zero-clears and stores pages (1) and if a process uses a page for the first time and a page fault occurs (2), the memory handler allocates a zero-cleared page (3). In addition, the OS restores processing of the process (4).

There is a method in which the first method and the second method are combined. Furthermore, there is a technique in which in a case where zero-clearing for a page of a memory is specified, zero-clearing information is stored for the relevant page of the memory while not zero-clearing the relevant page and an access to the relevant page is controlled based on the zero-clearing information, thereby reducing processing time. There is a technique in which if initial reference is generated in a new page in a virtual storage management system, a page frame is allocated and a paging subsystem initially sets to zero. As Related arts, for example, Japanese Laid-open Patent Publication No. 10-3423 and Japanese Laid-open Patent Publication No. 63-025747 are disclosed.

However, in the methods of the related art for the zero-clearing, there is a problem that the processing of a process is stopped during the processing of the zero-clearing. In the first method, the zero-clearing is performed only after a usage request is issued from a process. Therefore, a time cost ranged from when a process causes a page fault to when being able to be restored becomes very high.

In the second method, if zero-cleared pages disappear, processing for the zero-clearing becomes desirable. In the second method, there is a problem such as how to charge the zero-clearing processing for CPU time. From the above, it is desirable to be able to reduce stop time of a process at the time of page allocation.

SUMMARY

According to an aspect of the invention, a memory access processing method executed by one or more processors included in an information processing device, the memory access processing method includes storing, in a cache memory, a plurality of pages stored in a main memory; storing the plurality of pages in a buffer memory, each of the plurality of pages being associated with an identifier indicating whether the each of the plurality of pages being a zero page to be zero-cleared; allocating a page to be set to the zero page from among the plurality of pages, when a page fault occurs during execution of an access to the cache memory and execution of a process is stopped; updating an identifier corresponding to the allocated page to an identifier indicating the allocated page being the zero page; resuming the execution of the process; controlling an access to the cache memory, based on the identifier for each of the plurality of pages stored in the buffer memory; and executing initialization of a page corresponding to the allocated page and is included in the main memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an information processing device and a memory access processing method, disclosed in the present application, will be described in detail based on drawings. These embodiments do not limit the disclosed technology.

Figure 1:
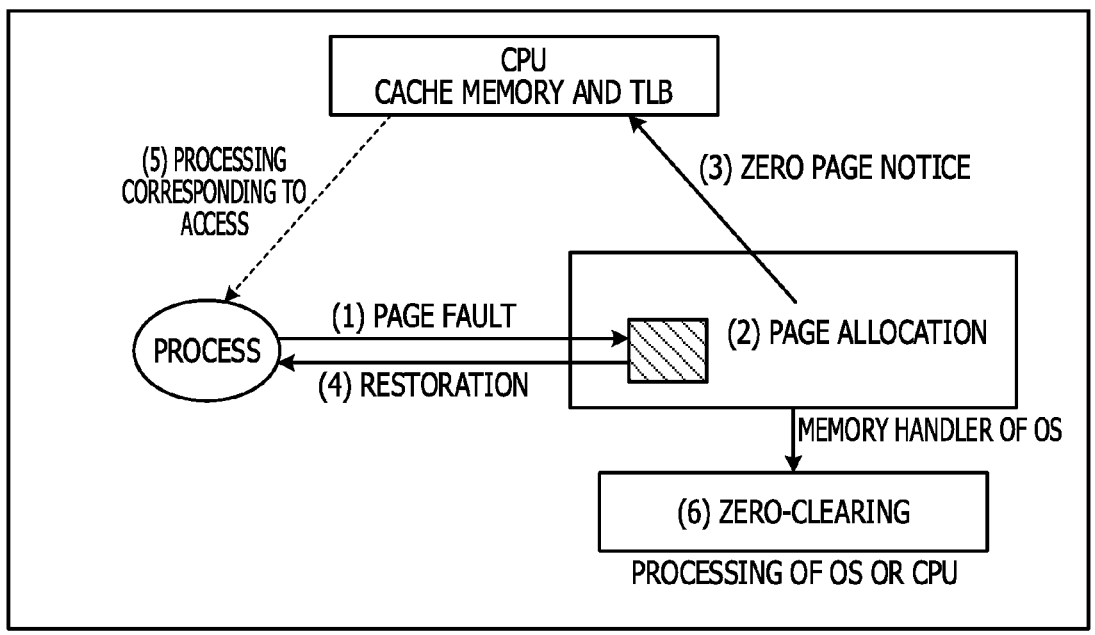
FIG. 1 is a diagram for explaining memory allocation processing based on an information processing device according to an embodiment.

First, memory allocation processing of the information processing device according to the corresponding embodiment will be described. FIG. 1 is a diagram for explaining the memory allocation processing based on the information processing device according to the embodiment. As illustrated in FIG. 1, in the information processing device according to the embodiment, if a process uses a page for the first time and a page fault occurs (1), a memory handler of an OS allocates a page (2) and transmits a zero page notice to a cache mechanism of a CPU (3).

Here, the zero page notice is a notice informing that a page is a page to be zero-cleared, in other words, a zero page. The cache mechanism includes a translation lookaside buffer (TLB), which speeds up translation from a virtual address to a physical address, and a cache memory.

In addition, the OS restores processing of the process (4). In other words, while not zero-clearing an allocated page, the OS restores processing of the process only by issuing the zero page notice to the cache mechanism. After that, if the process accesses the allocated zero page, the cache mechanism performs processing corresponding to an access request (5). Out of synchronization with the allocation of a page, the OS or the CPU zero-clears the zero page (6).

In this way, while not zero-clearing the allocated page, the OS restores processing of the process only by issuing the zero page notice to the cache mechanism. Out of synchronization with the allocation of the page, the OS or the CPU zero-clears the zero page. Therefore, it is possible for the OS to reduce the stop time of the process at the time of memory allocation.

Figure 2:
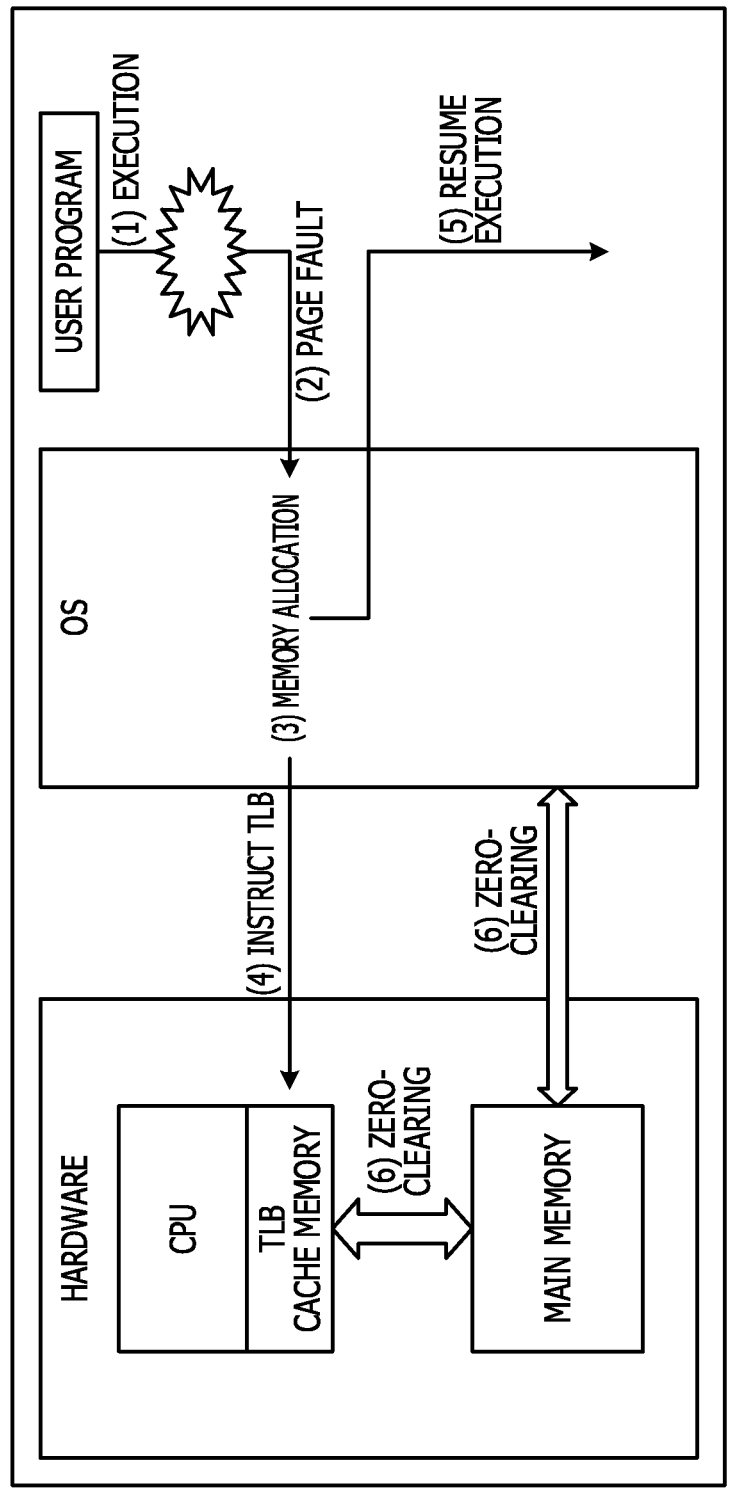
FIG. 2 is a diagram illustrating a memory allocation operation of the information processing device according to the embodiment.

Next, a memory allocation operation of the information processing device according to the embodiment will be described. FIG. 2 is a diagram illustrating the memory allocation operation of the information processing device according to the embodiment. As illustrated in FIG. 2, if a user program operating as a process uses a page for the first time during execution (1) and a page fault occurs (2), the OS performs memory allocation (3).

In addition, the OS instructs the TLB to store that an allocated page is a zero page (4), and resumes execution of the user program (5). The OS or the CPU zero-clears the zero page at a specific timing as appropriate (6).

In this way, the OS instructs the TLB to store that the allocated page is the zero page, and resumes the execution of the user program. Therefore, it is possible to reduce the stop time of the user program at the time of memory allocation.

Figure 3:
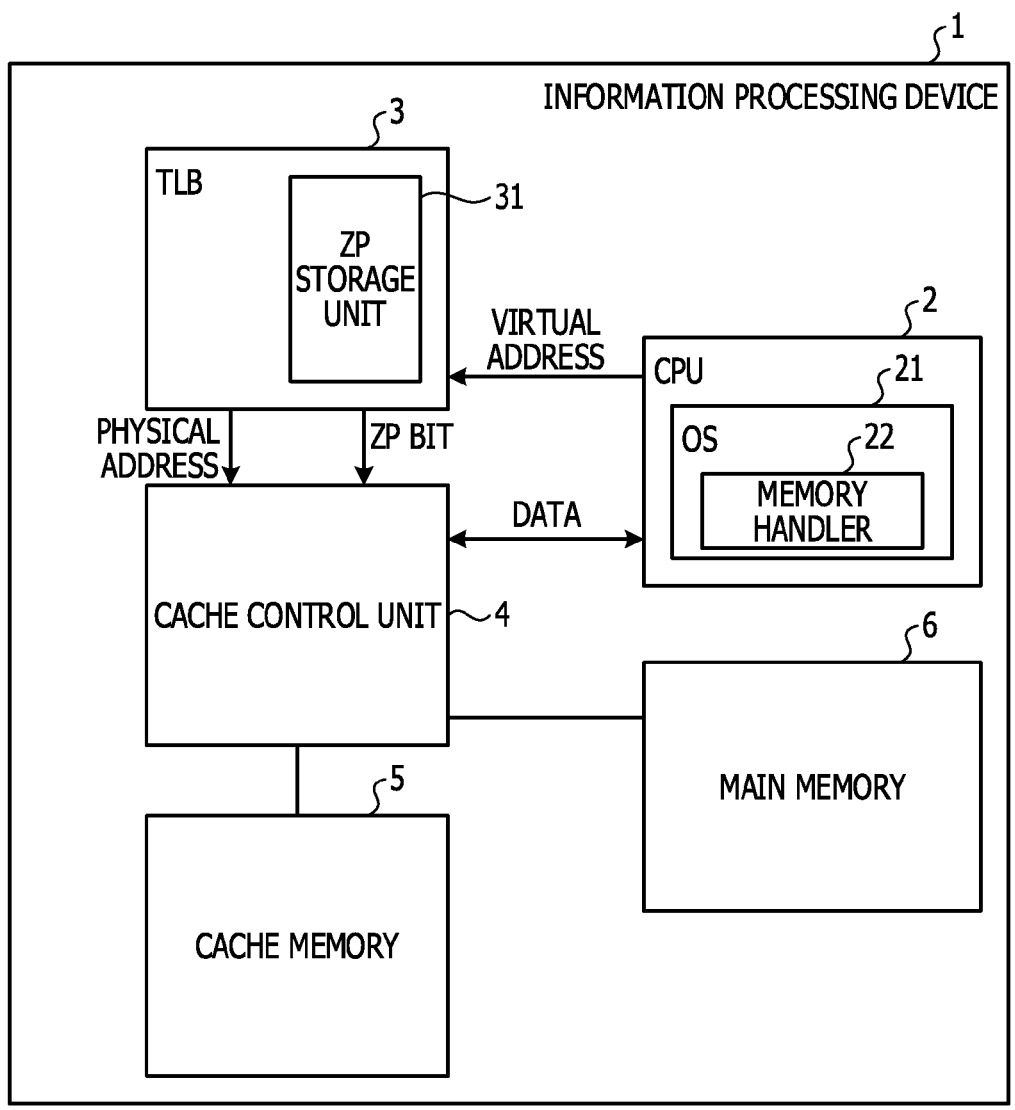
FIG. 3 is a diagram illustrating a configuration of the information processing device according to the embodiment.

Next, a configuration of the information processing device according to the embodiment will be described. FIG. 3 is a diagram illustrating the configuration of the information processing device according to the embodiment. As illustrated in FIG. 3, an information processing device 1 includes a CPU 2, a TLB 3, a cache control unit 4, a cache memory 5, and a main memory 6.

The CPU 2 is a central processing unit that reads and executes a program from the main memory 6. The CPU 2 executes an OS 21. The OS 21 is basic software that performs management of resources of the information processing device 1, management of programs executed in the CPU 2, and so forth. The OS 21 includes a memory handler 22 that performs allocation of the main memory 6 to a process and so forth.

The TLB 3 stores therein virtual addresses and physical addresses while associating the virtual addresses and the respective physical addresses to each other. If a virtual address is input from the CPU 2, the TLB 3 outputs, to the cache control unit 4, a physical address corresponding to the virtual address.

Figure 4:
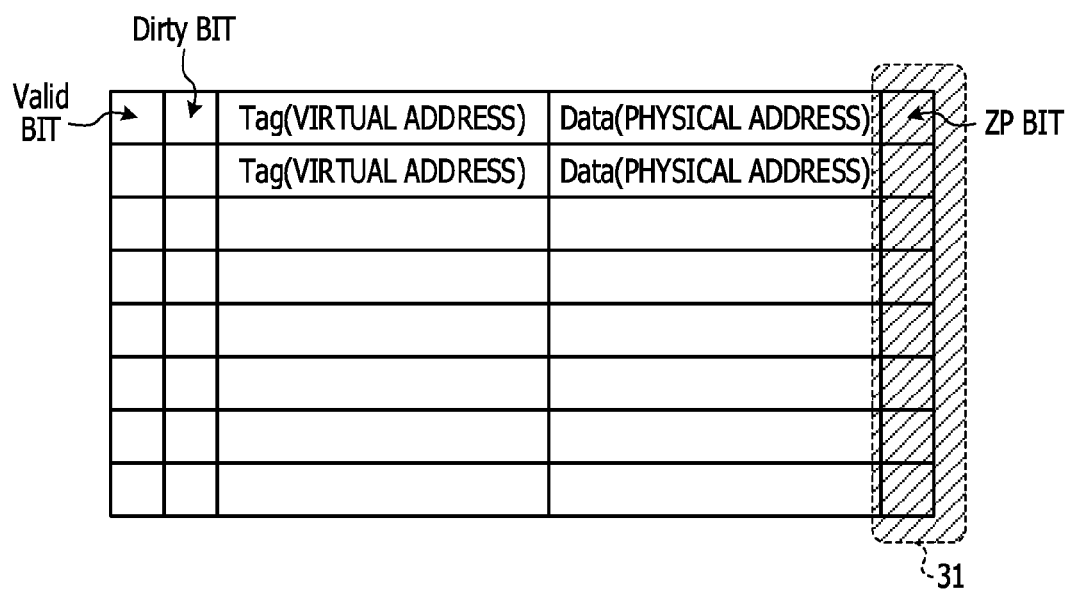
FIG. 4 is a diagram for explaining a ZP bit.

The TLB 3 includes a ZP storage unit 31. For each entry of the TLB 3, the ZP storage unit 31 stores therein a ZP bit indicating whether or not the entry is the zero page. FIG. 4 is a diagram for explaining the ZP bit. FIG. 4 illustrates a configuration of the TLB 3. As illustrated in FIG. 4, each entry of the TLB 3 includes a Valid bit, a Dirty bit, a Tag, a Data, and the corresponding ZP bit.

Each of the Valid bits is a bit indicating whether or not a corresponding entry is valid. Each of Dirty bits is a bit indicating whether or not there is a change in a page corresponding to an entry. Each of the Tags is a virtual address. Each of the Datas is a physical address corresponding to a virtual address.

If being set to "1", each of the ZP bits indicates that the corresponding page is the zero page. Based on an instruction of the OS 21, the TLB 3 sets the corresponding ZP bit to "1". The TLB 3 provides, along with a physical address, the corresponding ZP bit to the cache control unit 4.

Returning to FIG. 3, the cache control unit 4 is a processor that controls read and write of the cache memory 5. Based on a physical address and a corresponding ZP bit, provided by the TLB 3, the cache control unit 4 controls an access to a page.

In a case where the corresponding ZP bit is "1", if a cache miss occurs in a read access, the cache control unit 4 adds a cache entry, filled with zero, to the cache memory 5 and returns the zero page to an access request source. At this time, the cache control unit 4 performs no access to a memory.

In a case of using the main memory 6, a user reads data after writing the data into the main memory 6. It is considered that a read access is hardly performed on a page whose ZP bit is "1", in other words, the zero page. However, as proactive processing, the cache control unit 4 performs read access processing on the zero page.

In a case where the corresponding ZP bit is "1", if a cache miss occurs in a write access, the cache control unit 4 adds, to the cache memory 5, a cache entry filled with zero and reflects a written content in the added cache entry. At this time, the cache control unit 4 performs no access to the main memory 6.

In a case where the corresponding ZP bit is "1", if a cache hit occurs, the cache control unit 4 accesses the cache entry in which the hit occurs. At this time, the cache control unit 4 performs no access to the main memory 6. For a page whose ZP bit is "1", the cache control unit 4 processes all memory accesses using the cache memory 5 and does not perform swap-out of the page whose ZP bit is "1".

In a case where the corresponding ZP bit is "0", the cache control unit 4 performs the same operation as that of the related art. In other words, in a case where a cache hit occurs, the cache control unit 4 accesses a cache entry in which the hit occurs, and in a case where no cache hit occurs, the cache control unit 4 accesses the main memory 6.

In a case where an instruction to access the main memory 6 from the CPU 2 while getting around the cache memory 5 is issued, the cache control unit 4 raises an exception and passes control to the OS 21. The OS 21 determines whether or not zero-clearing is desired. In a case where the zero-clearing is desired, the OS 21 zero-clears a page of the main memory 6. To access the main memory 6 from the CPU 2 while getting around the cache memory 5 occurs in processing operations or the like in, for example, a video driver and high performance computing (HPC).

In order to speed up an access from the CPU 2 to the main memory 6, the cache memory 5 stores therein a portion of a page stored in the main memory 6. The main memory 6 is, for example, a random access memory (RAM) that stores therein a program, an intermediate result of execution of the program, and so forth.

Figure 5:
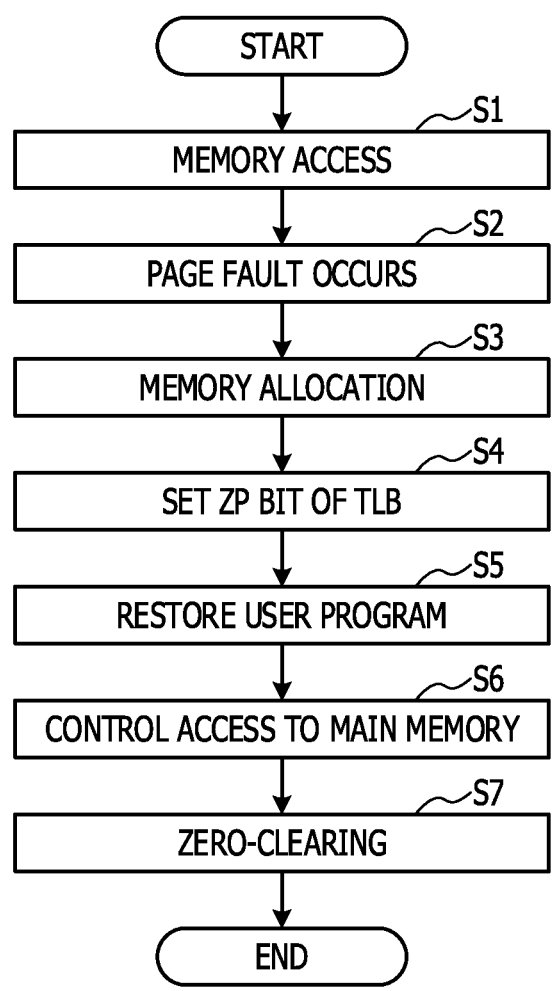
FIG. 5 is a flowchart illustrating a flow of memory access processing based on the information processing device according to the embodiment.

Next, a flow of memory access processing based on the information processing device 1 according to the embodiment will be described. FIG. 5 is a flowchart illustrating the flow of the memory access processing based on the information processing device 1 according to the embodiment.

As illustrated in FIG. 5, a user program that operates in the information processing device 1 performs a memory access (S1). In a case of a page used for the first time, a page fault occurs (S2). Then, the OS 21 performs memory allocation (S3) and sets the ZP bit of the corresponding page within the TLB 3 (S4). In addition, the OS 21 restores the user program (S5).

After that, if the main memory 6 is accessed based on execution of the user program, the cache control unit 4 controls an access to the main memory 6, based on the corresponding ZP bit (S6). In addition, out of synchronization with the memory allocation, the CPU 2 or the OS 21 zero-clears the corresponding zero page (S7).

In this way, only by setting the corresponding ZP bit of the TLB 3, the OS 21 restores the user program while not zero-clearing a page of the main memory 6. Therefore, it is possible to reduce the stop time of the user program.

Figure 6:
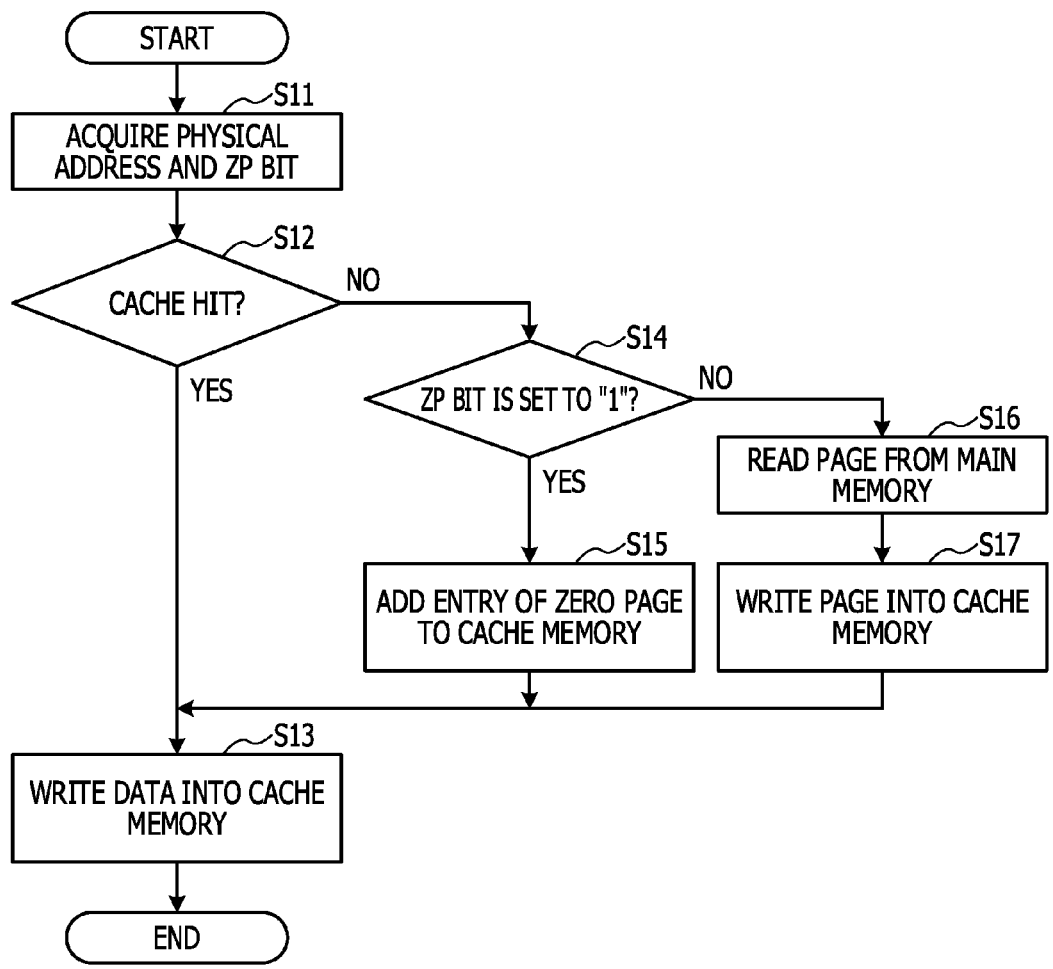
FIG. 6 is a flowchart illustrating a flow of write processing based on a cache control unit.

Next, a flow of write processing based on the cache control unit 4 will be described. FIG. 6 is a flowchart illustrating the flow of the write processing based on the cache control unit 4. As illustrated in FIG. 6, the cache control unit 4 acquires a physical address and the corresponding ZP bit from the TLB 3 (S11).

In addition, the cache control unit 4 determines whether or not a cache hit occurs (S12). In a case where it is determined that the cache hit occurs, the cache control unit 4 writes data into the cache memory 5 (S13).

On the other hand, in a case where it is determined that no cache hit occurs, the cache control unit 4 determines whether or not the corresponding ZP bit is set to "1" (S14). As a result, in a case where the corresponding ZP bit is set to "1", the cache control unit 4 adds, to the cache memory 5, the entry of the corresponding zero page while associating the entry of the corresponding zero page with a physical address (S15) and writes data into the cache memory 5 (S13).

On the other hand, in a case where the corresponding ZP bit is not set to "1", the cache control unit 4 reads a page from the main memory 6 (S16) and writes the page into the cache memory 5 (S17). In addition, the cache control unit 4 writes data into the cache memory 5 (S13).

In this way, in a case where the corresponding ZP bit is set to "1", the cache control unit 4 adds, to the cache memory 5, the entry of the corresponding zero page, thereby enabling a process to perform writing into the corresponding zero page.

Figure 7:
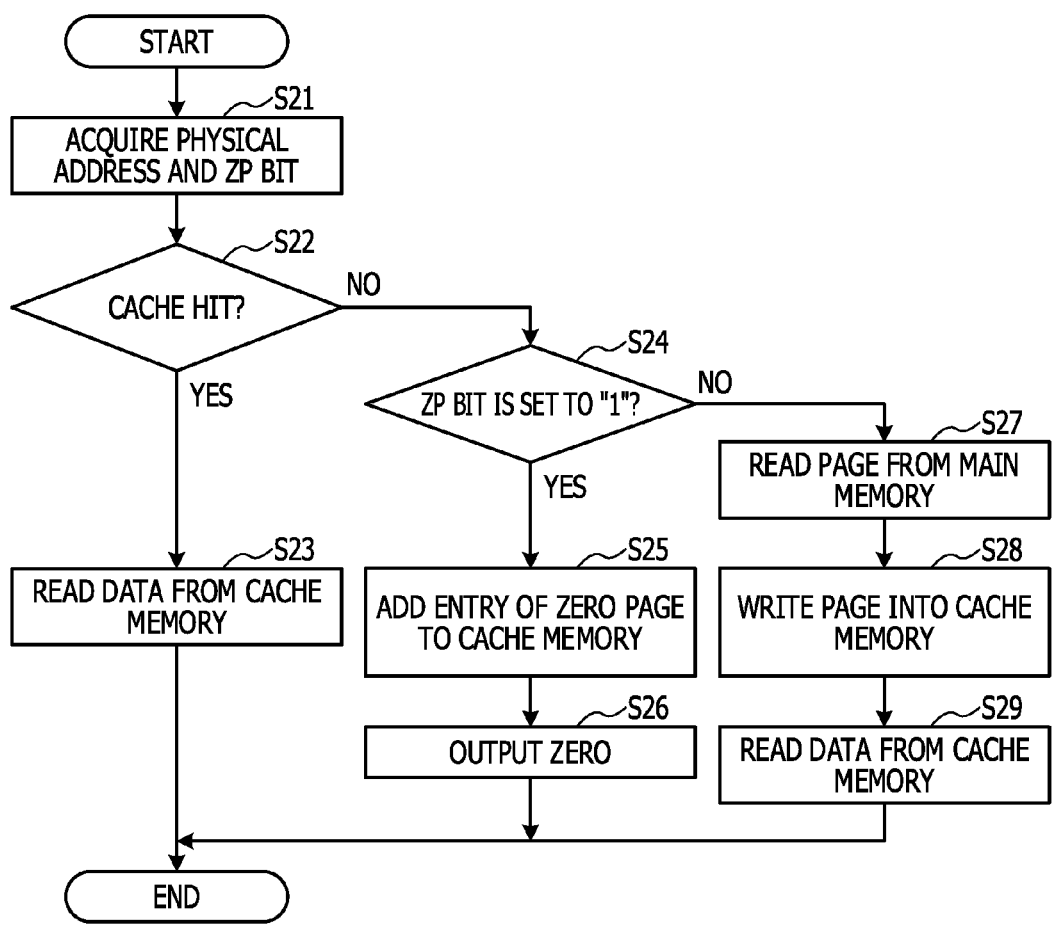
FIG. 7 is a flowchart illustrating a flow of read processing based on the cache control unit.

Next, a flow of read processing based on the cache control unit 4 will be described. FIG. 7 is a flowchart illustrating the flow of the read processing based on the cache control unit 4. As illustrated in FIG. 7, the cache control unit 4 acquires a physical address and the corresponding ZP bit from the TLB 3 (S21).

In addition, the cache control unit 4 determines whether or not a cache hit occurs (S22). In a case where it is determined that the cache hit occurs, the cache control unit 4 reads data from the cache memory 5 (S23).

On the other hand, in a case where it is determined that no cache hit occurs, the cache control unit 4 determines whether or not the corresponding ZP bit is set to "1" (S24). As a result, in a case where it is determined that the corresponding ZP bit is set to "1", the cache control unit 4 adds, to the cache memory 5, the entry of the corresponding zero page while associating the entry of the corresponding zero page with a physical address (S25) and outputs zero as data (S26).

On the other hand, in a case where it is determined that the corresponding ZP bit is not set to "1", the cache control unit 4 reads a page from the main memory 6 (S27) and writes the page into the cache memory 5 (S28). In addition, the cache control unit 4 reads data from the cache memory 5 (S29).

In this way, in a case where the corresponding ZP bit is set to "1", the cache control unit 4 adds, to the cache memory 5, the entry of the corresponding zero page and outputs zero. From this, it is possible for a process to read data from the corresponding zero page.

Next, zero-clearing of the zero page, performed out of synchronization with the memory allocation, will be described using FIG. 8 to FIG. 10. Zero-clearing processing may be performed when the CPU 2 is in a state of idling and may be performed by a support mechanism of hardware. Alternatively, in a case where the information processing device 1 includes a plurality of CPUs 2, a redundant CPU 2 may perform the zero-clearing processing.

Figure 8:
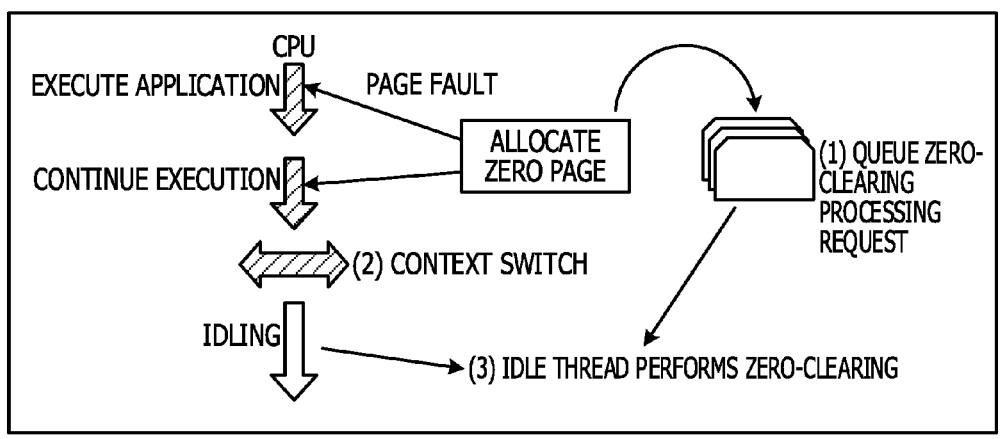
FIG. 8 is a diagram for explaining zero-clearing processing performed by a CPU at the time of idling.

FIG. 8 is a diagram for explaining the zero-clearing processing performed by the CPU 2 at the time of idling. As illustrated in FIG. 8, upon allocating the corresponding zero page, the OS 21 queues a zero-clearing processing request (1). An application to which the corresponding zero page is allocated continues execution.

After that, the OS 21 performs context switch (2). If the CPU 2 is put into an idle state, an idle thread performs zero-clearing, based on the queued zero-clearing processing request (3).

Figure 9:
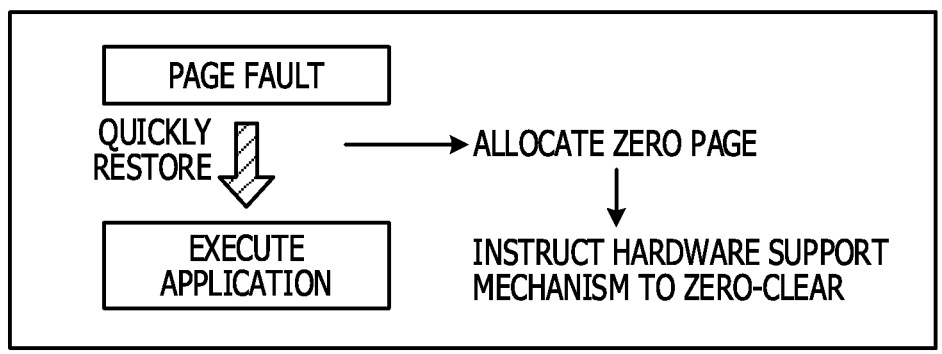
FIG. 9 is a diagram for explaining zero-clearing based on hardware support.

FIG. 9 is a diagram for explaining zero-clearing based on hardware support. As illustrated in FIG. 9, upon allocating the corresponding zero page, the OS 21 instructs a hardware support mechanism to zero-clear. Examples of the hardware support mechanism include a mechanism for performing burst transfer on the main memory 6 and a mechanism for zero-clearing a page within a main controller.

Figure 10:
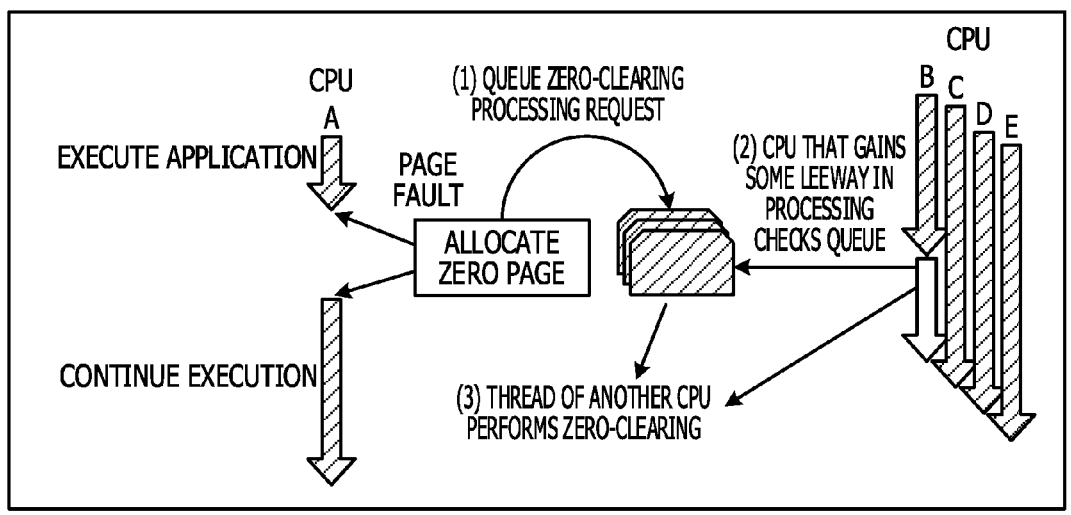
FIG. 10 is a diagram for explaining zero-clearing processing based on a redundant CPU.
Figure 11A:
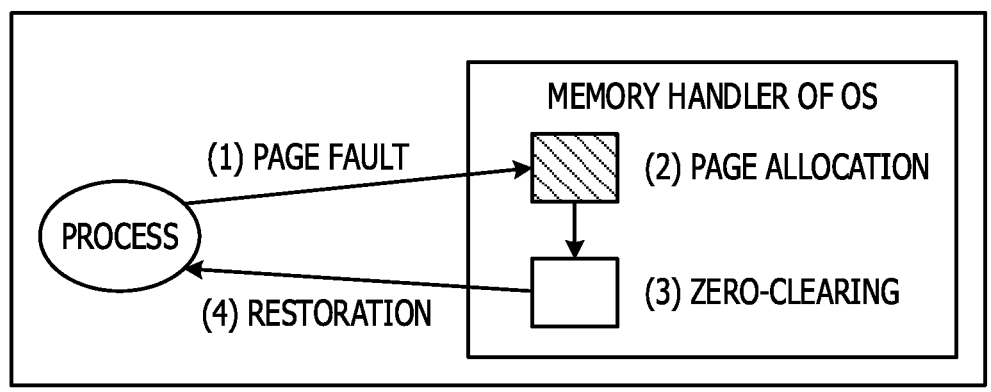
FIG. 11A is a diagram for explaining a first method for zero-clearing.
Figure 11B:
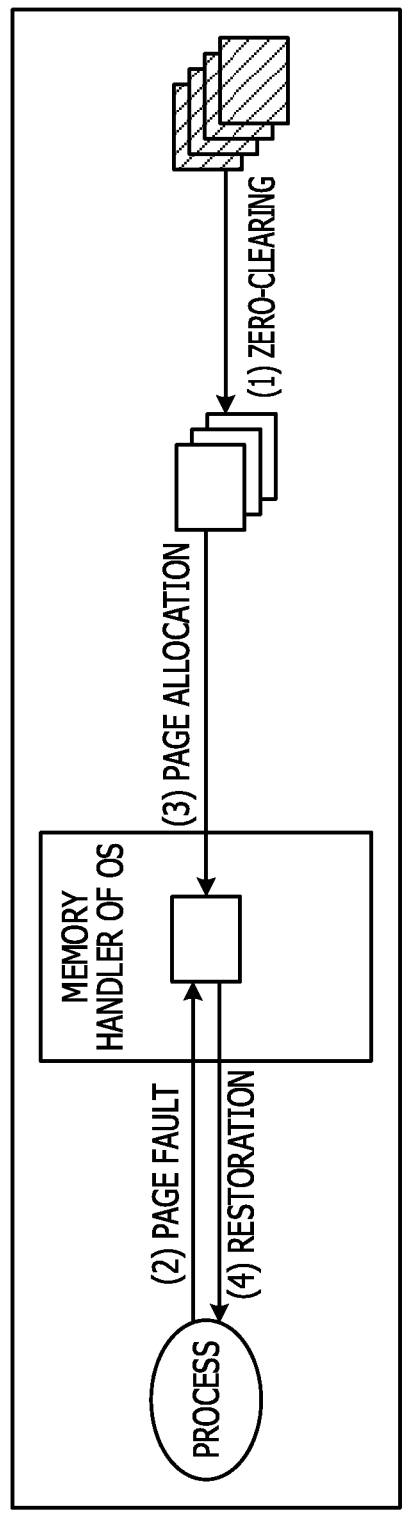
FIG. 11B is a diagram for explaining a second method for the zero-clearing.

FIG. 10 is a diagram for explaining the zero-clearing processing based on the redundant CPU 2. As illustrated in FIG. 10, upon allocating the corresponding zero page, the OS 21 queues a zero-clearing processing request (1). An application to which the corresponding zero page is allocated continues execution.

In addition, one of the CPUs 2, which gains some leeway in processing, checks a queue of the zero-clearing processing request (2). In FIG. 10, the application is executed in a CPU "A". A CPU "B" out of the other two CPUs 2, which gains some leeway in processing, checks the queue of the zero-clearing processing request. In addition, a thread of the CPU "B" performs zero-clearing (3).

In this way, one of the CPUs 2, the hardware support mechanism, or the redundant CPU 2 zero-clears the corresponding zero page out of synchronization with the memory allocation. From this, it is possible to skip zero-clearing based on the memory handler 22. The OS 21 resets, to "0", the ZP bit corresponding to the zero-cleared page.

As described above, in the embodiment, by allocating the corresponding zero page to a process, the OS 21 resumes execution of the process while not zero-clearing the allocated page. The OS 21 sets, to "1", the ZP bit corresponding to the zero page in the TLB 3. In addition, based on the corresponding ZP bit, the cache control unit 4 controls an access to the cache memory 5. One of the CPUs 2, the hardware support mechanism, or the redundant CPU 2 zero-clears the corresponding zero page out of synchronization with the memory allocation. Accordingly, it is possible for the OS 21 to reduce the stop time of a process due to the zero-clearing processing at the time of page allocation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A memory access processing method executed by one or more processors included in an information processing device, the memory access processing method comprising:
   storing, in a cache memory, a plurality of pages stored in a main memory;
   storing the plurality of pages in a buffer memory, each of the plurality of pages being associated with an identifier indicating whether the each of the plurality of pages being a zero page to be zero-cleared;
   allocating a page to be set to the zero page from among the plurality of pages, when a page fault occurs during execution of an access to the cache memory and execution of a process is stopped;
   updating an identifier corresponding to the allocated page to an identifier indicating the allocated page being the zero page;
   resuming the execution of the process;
   controlling an access to the cache memory, based on the identifier for each of the plurality of pages stored in the buffer memory; and
   executing initialization of a page corresponding to the allocated page and is included in the main memory.

2. The memory access processing method according to claim 1, further comprising:
   adding an entry of a zero page to the cache memory and writing data into the added entry, when a request to write data into a page with which an identifier indicating the page being the zero page is associated within the buffer memory is issued and an entry of the page does not exist in the cache memory.

3. The memory access processing method according to claim 1, further comprising:
   adding an entry of a zero page to the cache memory and outputting zero as read data, when a request to read data from a page with which an identifier indicating the page being the zero page is associated within the buffer memory is issued and an entry of the page does not exist in the cache memory.

4. The memory access processing method according to claim 1, further comprising:
   changing an identifier corresponding to the initialized page to an identifier indicating the initialized page not being the zero page.

5. The memory access processing method according to claim 1,
   wherein each of the plurality of pages includes a virtual address and a physical address which are associated with each other.

6. The memory access processing method according to claim 1,
   wherein the identifier is bit data.

7. The memory access processing method according to claim 6, further comprising:
   determining a processor to execute the initialization from among the one or more processors based on a result of the detecting.

8. The memory access processing method according to claim 1, further comprising:
   detecting that, based on an occurrence of context switch, one of the one or more processors is put into an idle state.

9. An information processing device comprising:
   a main memory;
   a cache memory configured to store a plurality of pages stored in the main memory;
   a buffer memory configured to store the plurality of pages, each of the plurality of pages being associated with an identifier indicating whether the each of the plurality of pages being a zero page to be zero-cleared; and
   one or more processors configured to:
      allocate a page to be set to a zero page from among the plurality of pages, when a page fault occurs during execution of an access to the cache memory and execution of a process is stopped;
      update an identifier corresponding to the allocated page to an identifier indicating the allocated page being the zero page ;
      resume the execution of the process;
      control an access to the cache memory, based on the identifier for each of the plurality of pages stored in the buffer memory; and
      execute initialization of a page corresponding to the allocated page and is included in the main memory.

10. The information processing device according to claim 9,
    wherein the one or more processors is configured to add an entry of a zero page to the cache memory and write data into the added entry, when a request to write data into a page with which an identifier indicating the page being the zero page is associated within the buffer memory is issued and an entry of the page does not exist in the cache memory.

11. The information processing device according to claim 9,
    wherein the one or more processors is configured to add an entry of a zero page to the cache memory and outputting zero as read data, when a request to read data from a page with which an identifier indicating the page being the zero page is associated within the buffer memory is issued and an entry of the page does not exist in the cache memory.

12. The information processing device according to claim 9,
    wherein the one or more processors is configured to change an identifier corresponding to the initialized page to an identifier indicating the initialized page not being the zero page.

* * * * *